(12) United States Patent
Oyanagi et al.

(10) Patent No.: US 7,156,909 B2
(45) Date of Patent: Jan. 2, 2007

(54) OILY INK COMPOSITION FOR INK-JET RECORDING, AND INK-JET RECORDING METHOD

(75) Inventors: Takashi Oyanagi, Nagano (JP); Kiyohiko Takemoto, Nagano (JP); Yukio Sugita, Kanagawa (JP)

(73) Assignee: Seiko Epson Corporation, Tokyo (JP)

( * ) Notice: Subject to any disclaimer, the term of this patent is extended or adjusted under 35 U.S.C. 154(b) by 283 days.

(21) Appl. No.: 10/466,229

(22) PCT Filed: Jan. 15, 2002

(86) PCT No.: PCT/JP02/00176

§ 371 (c)(1),
(2), (4) Date: Dec. 9, 2003

(87) PCT Pub. No.: WO02/055619

PCT Pub. Date: Jul. 18, 2002

(65) Prior Publication Data

US 2004/0094067 A1    May 20, 2004

(30) Foreign Application Priority Data

Jan. 15, 2001   (JP) .............................. 2001-006313

(51) Int. Cl.
*C09D 11/02* (2006.01)
(52) U.S. Cl. ................. 106/31.58; 106/31.86
(58) Field of Classification Search ............ 106/31.58, 106/31.86; 347/100
See application file for complete search history.

(56) References Cited

U.S. PATENT DOCUMENTS

| | | | |
|---|---|---|---|
| 5,863,371 A | 1/1999 | Takemoto et al. ....... | 156/273.3 |
| 5,980,624 A * | 11/1999 | Ichikawa ................. | 106/31.58 |
| 6,561,624 B1 * | 5/2003 | Kikugawa et al. ............ | 347/45 |
| 6,562,116 B1 * | 5/2003 | Satoh ....................... | 106/31.58 |
| 2004/0266907 A1 * | 12/2004 | Sugita et al. ............... | 523/160 |

FOREIGN PATENT DOCUMENTS

| | | |
|---|---|---|
| EP | 0386349 | 9/1990 |
| EP | 0649888 | 4/1995 |
| JP | 55-145771 | 11/1980 |
| JP | 02-248474 | 10/1990 |
| JP | 5-508883 | 12/1993 |
| JP | 2000-345082 | 12/2000 |
| JP | 2001-98204 | 4/2001 |

OTHER PUBLICATIONS

Patent Abstract of Japan of JP 02-248474 dated Oct. 4, 1990.

* cited by examiner

*Primary Examiner*—J. A. Lorengo
*Assistant Examiner*—Veronica F. Faison
(74) *Attorney, Agent, or Firm*—Ladas and Parry LLP

(57) ABSTRACT

An oil based ink composition for ink jet recording containing, as an organic solvent, a mixture of a diethylene glycol compound that is liquid at ordinary temperature under atmospheric pressure and a dipropylene glycol compound that is liquid at ordinary temperature under atmospheric pressure at a diethylene glycol compound to dipropylene glycol compound weight ratio of 20:80 to 80:20, and an ink jet recording method using the oil based ink composition are disclosed. The oil based ink composition for ink jet recording provides high quality images with high gloss, excellent abrasion resistance and water resistance, and freedom from blur or bleeding.

19 Claims, 2 Drawing Sheets

F I G. 3
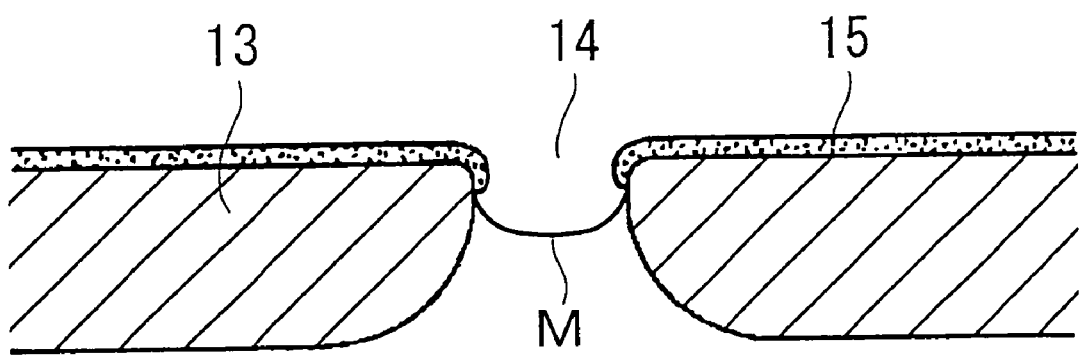
F I G. 4
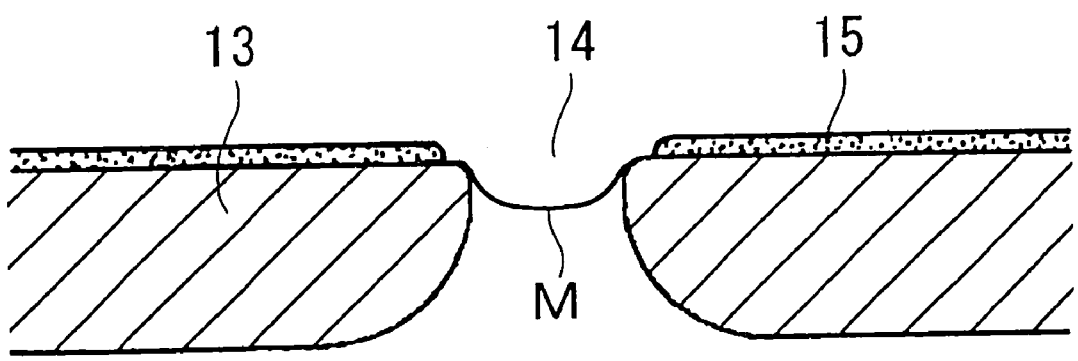

OILY INK COMPOSITION FOR INK-JET RECORDING, AND INK-JET RECORDING METHOD

TECHNICAL FIELD

This invention relates to an oil based ink composition for ink jet recording and an ink jet recording method using the oil based ink composition.

BACKGROUND ART

Various techniques are known for ink jet recording, including an electric field control system in which ink is ejected by using an electrostatic force, a drop-on-demand or pressure pulse system in which ink is ejected by using a driving pressure of a piezoelectric element, and a bubble jet or thermal jet system in which ink is ejected by using the pressure of an air bubble formed and expanded by high heat. Extremely precise images can be obtained by these systems. These ink jet recording systems generally use water based inks comprising water as a main solvent and oil based inks comprising an organic solvent as a main solvent.

Images printed with water based inks generally have poor water resistance, and it is difficult with water based inks to print recording media having a water-resistant surface. On the other hand, oil based inks are capable of providing printed images with excellent water resistance and are easy to put on recording media having a water-resistant surface or wood-free paper. Further, oil based inks containing a pigment as a colorant exhibit excellent light fastness.

It is known that the ejection nozzle surface of a recording head of an ink jet recording apparatus is subjected to an ink repellent treatment (water repellent treatment) to prevent the nozzle from being wetted with ink droplets thereby to improve ink droplet ejection properties. Conventional oil based pigment inks, however, wet such an ink-repellent head and spread thereon, causing instable ink ejection or corrosion of the head.

Organic solvents that have generally been used in conventional oil based inks include aromatic hydrocarbons, such as toluene and xylene; aliphatic hydrocarbons, such as hexane and kerosine; ketones, such as methyl ethyl ketone; and esters, such as ethyl acetate. These organic solvents have been difficult to use because they can dissolve or swell plastics (e.g., polystyrene or ABS resins) used to make apparatus and parts, such as ink containers and printers to significantly reduce the strength of the apparatus or the parts or the bond strength of joints. Where use of such an organic solvent is unavoidable, it has been necessary to metallize the parts of the apparatus which come into contact with ink or to render the parts solvent-resistant, which has been economically disadvantageous.

JP-W-A-5-508883 (The term "JP-W-A" used herein means an international patent application published in the Japanese national proceeding) (U.S. Pat. No. 5,663,217) discloses an oil based ink, claiming its satisfactory printing capabilities on plain paper. However, since the oil based ink described in Examples contain tripropylene glycol monoethyl ether, it has difficulty in securing long-term ejection stability in a head with a nozzle plate having been made ink-repellent. JP-A-55-145771 (The term "JP-A" used herein means an unexamined published Japanese patent application) discloses an oil based ink with assertion that the ink exhibits satisfactory recording capabilities on highly sized recording paper (plain paper). However, the oil based ink fails to obtain ejection stability on account of improper physical properties, such as viscosity. As will be apparent from the results of printing tests for evaluation (evaluations-1 to -3) carried out in Examples given infra, all the oil based inks of these related arts turned out to be unsatisfactory.

Additionally, the conventional oil based pigment inks have been insufficient in image gloss, water resistance, abrasion resistance, resistance to blur and bleeding. Improvements on these attributes have also been desired.

An object of the present invention is to provide an oil based ink composition for ink jet recording which eliminates the above-mentioned disadvantages associated with conventional ink technology and provides high quality images with high gloss, excellent resistance to water and abrasion, and freedom from blur or bleeding.

DISCLOSURE OF THE INVENTION

The above object is accomplished by an oil based ink composition for ink jet recording according to the present invention, which contains, as an organic solvent, a mixture of a diethylene glycol compound that is liquid at ordinary temperature under atmospheric pressure and a dipropylene glycol compound that is liquid at ordinary temperature under atmospheric pressure at a diethylene glycol compound to dipropylene glycol compound weight ratio of 20:80 to 80:20.

In a preferred embodiment of the present invention, the diethylene glycol compound is represented by general formula (I):

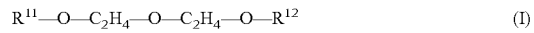

$$R^{11}\text{—O—}C_2H_4\text{—O—}C_2H_4\text{—O—}R^{12} \quad (I)$$

wherein $R^{11}$ and $R^{12}$ each independently represent a hydrogen atom, an alkyl group having 1 to 4 carbon atoms or a group $R^{13}CO$; and $R^{13}$ represents an alkyl group having 1 to 4 carbon atoms, and more preferably the diethylene glycol compound is diethylene glycol diethyl ether.

In another preferred embodiment of the present invention, the dipropylene glycol compound is represented by general formula (II):

$$R^{21}\text{—O—}C_3H_6\text{—O—}C_3H_6\text{—O—}R^{22} \quad (II)$$

wherein $R^{21}$ and $R^{22}$ each independently represent a hydrogen atom, an alkyl group having 1 to 4 carbon atoms or a group $R^{23}CO$; and $R^{23}$ represents an alkyl group having 1 to 4 carbon atoms, and more preferably the dipropylene glycol is dipropylene glycol monomethyl ether.

In still another preferred embodiment of the present invention, the oil based ink composition further contains (1) a polyethylene glycol monoether compound that is liquid at ordinary temperature under atmospheric pressure and is represented by general formula (III):

$$R^{31}\text{—O—}(C_2H_4\text{—O})_n\text{—H} \quad (III)$$

wherein $R^{31}$ represents an alkyl group having 1 to 6 carbon atoms; and n represents an integer of 3 to 6, the polyethylene glycol more preferably being a triethylene glycol monoether compound, or (2) a mixture of polyethylene glycol monoether compounds represented by general formula (III) in which n is 4 to 6. The oil based ink composition of this preferred embodiment can contain the diethylene glycol compound, the dipropylene glycol compound and the polyethylene glycol monoether compound in amounts of 30 to 50 parts by weight, 30 to 50 parts by weight and 10 to 30 parts by weight, respectively.

In yet another preferred embodiment of the present invention, the content of a colorant (preferably pigment) is 0.5 to 25% by weight based on the total weight of the ink composition.

The present invention also provides an ink jet recording method comprising ejecting the oil based ink composition according to the present invention from an ink jet printer head having an ejection nozzle surface which has been subjected to an ink repellent treatment.

BRIEF DESCRIPTION OF THE DRAWINGS

FIG. 3 is a schematic cross-section of an ink ejection orifice and its vicinity of a nozzle plate of a still other example of a printer head for ink jet recording, which can be used in the ink jet recording method of the present invention, having an ejection nozzle surface which has been subjected to an ink repellent treatment.

FIG. 4 is a schematic cross-section of an ink ejection orifice and its vicinity of a nozzle plate of an yet other example of a printer head for ink jet recording, which can be used in the ink jet recording method of the present invention, having an ejection nozzle surface which has been subjected to an ink repellent treatment.

BEST MODE FOR CARRYING OUT THE INVENTION

Figure 1:
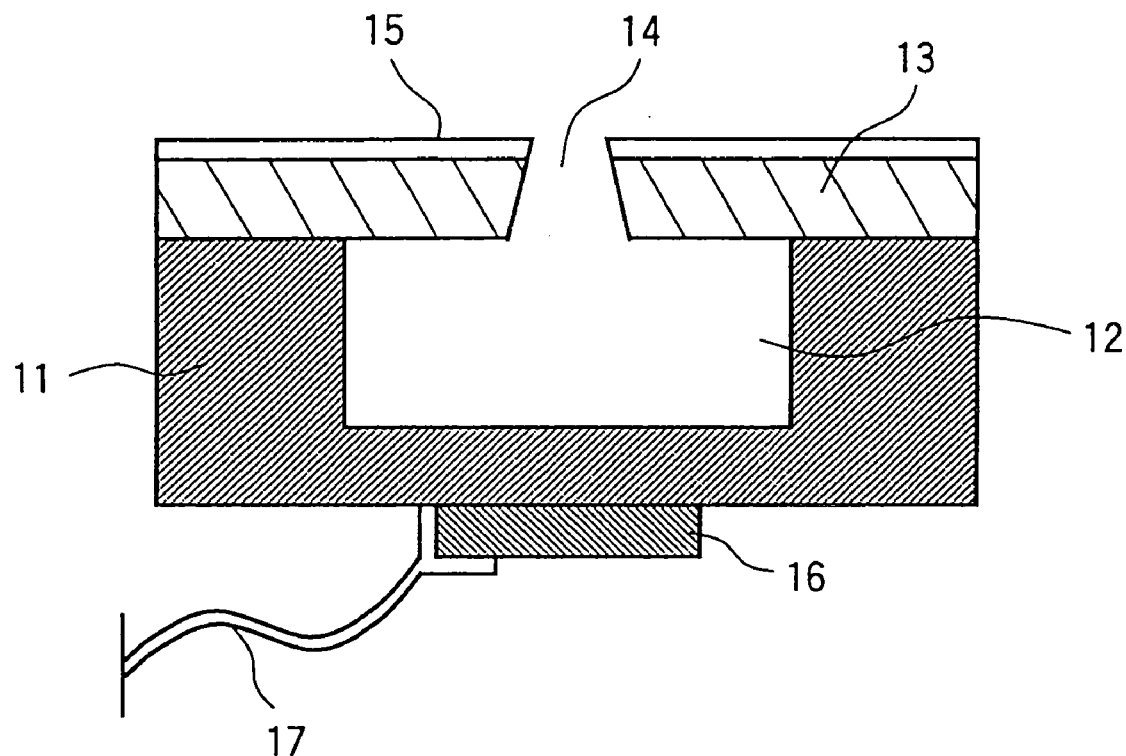
FIG. 1 is a schematic cross-section of an example of a printer head for ink jet recording, which can be used in the ink jet recording method of the present invention, having an ejection nozzle surface which has been subjected to an ink repellent treatment.

The colorants which can be used in the oil based ink composition of the present invention include pigments and dyes that have been generally used in conventional oil based ink compositions.

The pigments which can be used include inorganic ones and organic ones. Examples are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments, quinacridone pigments, isoindolinone pigments, dioxazine pigments, indanthrene pigments, perylene pigments, perinone pigments, thioindigo pigments, quinophthalone pigments, and metal complex pigments.

The dyes which can be used include azo dyes, metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes, and metal phthalocyanine dyes. Oil colors are particularly preferred.

The pigments and dyes can be used either individually or as a combination of two or more thereof.

The average particle size of pigment particles is preferably, but not limited to, 50 to 500 nm.

The colorant content of the oil based ink composition according to the invention is selected appropriately according to the use and printing characteristics and is preferably 0.5 to 25% by weight, still preferably 0.5 to 15% by weight, particularly preferably 1 to 10% by weight.

The oil based ink composition of the invention comprises a mixture of a diethylene glycol compound that is liquid at ordinary temperature under atmospheric pressure and a dipropylene glycol compound that is liquid at ordinary temperature under atmospheric pressure as an organic solvent.

The diethylene glycol compound for use in the invention includes those represented by general formula (I):

$$R^{11}-O-C_2H_4-O-C_2H_4-O-R^{12} \quad (I)$$

wherein $R^{11}$ and $R^{12}$ each independently represent a hydrogen atom, an alkyl group having 1 to 4 carbon atoms or a group $R^{13}CO$; and $R^{13}$ represents an alkyl group having 1 to 4 carbon atoms, and the dipropylene glycol compound for use in the invention includes those represented by general formula (II):

$$R^{21}-O-C_3H_6-O-C_3H_6-O-R^{22} \quad (II)$$

wherein $R^{21}$ and $R^{22}$ each independently represent a hydrogen atom, an alkyl group having 1 to 4 carbon atoms or a group $R^{23}CO$; and $R^{23}$ represents an alkyl group having 1 to 4 carbon atoms.

The "alkyl group having 1 to 4 carbon atoms" as referred to herein includes straight-chain or branched alkyl groups, such as a methyl group, an ethyl group, an n-propyl group, isopropyl group, an n-butyl group, an isobutyl group, a sec-butyl group, and a t-butyl group.

It is preferred for the diethylene glycol compound and the dipropylene glycol compound which can be used in the oil based ink composition of the invention to have a boiling point of 150° C. or higher, still preferably 180° C. or higher, under atmospheric pressure. It is preferred for the diethylene glycol compound and the dipropylene glycol compound which can be used in the oil based ink composition of the invention to have a vapor pressure of 1 hPa or lower, still preferably 0.7 hPa or lower, at 20° C. Use of the diethylene glycol compound and the dipropylene glycol compound which satisfy the above-specified high boiling point and low vapor pressure conditions lessens the expenses incurred for a local ventilation or exhaust system, improves the working environment, and reduces the load on the surrounding environment.

Examples of the diethylene glycol compounds which can be preferably used in the oil based ink composition of the invention include diethylene glycol; diethylene glycol ethers (especially alkyl ethers), such as diethylene glycol monomethyl ether, diethylene glycol dimethyl ether, diethylene glycol methyl ethyl ether, diethylene glycol monoethyl ether, diethylene glycol diethyl ether, diethylene glycol mono-n-butyl ether, and diethylene glycol di-n-butyl ether; and diethylene glycol esters, such as diethylene glycol monoethyl ether acetate, diethylene glycol mono-n-butyl ether acetate, and diethylene glycol monoacetate. Still preferred of them are diethylene glycol, diethylene glycol monomethyl ether, diethylene glycol monoethyl ether, diethylene glycol diethyl ether, diethylene glycol mono-n-butyl ether, diethylene glycol di-n-butyl ether, diethylene glycol monoethyl ether acetate, and diethylene glycol monobutyl ether acetate.

Examples of the dipropylene glycol compounds which can be preferably used in the oil based ink composition of the invention are dipropylene glycol and dipropylene glycol ethers (especially alkyl ethers), such as dipropylene glycol monomethyl ether and dipropylene glycol monoethyl ether.

The mixing ratio of the diethylene glycol compound and the dipropylene glycol compound in the oil based ink composition of the invention ranges from 20:80 to 80:20, preferably from 30:70 to 70:30, by weight. Out of the range 20:80 to 80:20, the ink composition tends to have impaired printing stability or deteriorated storage stability.

The content of the diethylene glycol compound/dipropylene glycol compound mixture in the oil based ink composition of the invention is selected appropriately according to printing characteristics and is preferably 50 to 99% by weight, still preferably 85 to 95% by weight.

The oil based ink composition of the invention can further contain a polyethylene glycol monoether compound represented by formula (III):

$$R^{31}\text{—O—}(C_2H_4\text{—O})_n\text{—H} \quad\quad\quad (III)$$

wherein $R^{31}$ represents an alkyl group having 1 to 6 carbon atoms (preferably an alkyl group having 1 to 4 carbon atoms); and n represents an integer of 3 to 6, as an organic solvent in addition to the diethylene glycol compound/dipropylene glycol compound mixture.

The alkyl group having 1 to 6 carbon atoms as referred to herein includes straight-chain or branched alkyl groups. Examples include the above-recited alkyl groups having 1 to 4 carbon atoms and, in addition, a straight-chain or branched pentyl group and a straight-chain or branched hexyl group.

It is preferred for the polyethylene glycol monoether compound which can be used in the oil based ink composition of the invention to have a boiling point of 200° C. or higher, particularly 250° C. or higher, under atmospheric pressure. It is also preferred for the polyethylene glycol monoether compound which can be used in the oil based ink composition of the invention to have an ignition point of 100° C. or higher, particularly 130° C. or higher. Use of such a polyethylene glycol monoether compound imparts volatilization suppressing properties to the oil based ink composition of the invention. For example, evaporation of the ink composition in a tube transporting an ink composition from an ink cartridge to the printer head is suppressed to thereby prevent or reduce accumulation of solids in the tube.

Examples of preferred polyethylene glycol monoether compounds are triethylene glycol monoether compounds (e.g., triethylene glycol monomethyl ether and triethylene glycol monobutyl ether) and mixtures of the polyethylene glycol monoether compounds of general formula (III) in which n is 4 to 6 (especially polyethylene glycol monomethyl ethers), such as a mixture of tetraethylene glycol monomethyl ether, pentaethylene glycol monomethyl ether, and hexaethylene glycol monomethyl ether.

Where the oil based ink composition of the present invention contains the polyethylene glycol monoether compound in addition to the diethylene glycol compound and the dipropylene glycol compound, the polyethylene glycol monoether compound is preferably used in an amount of 10 to 30 parts by weight per 30 to 50 parts by weight of the diethylene glycol compound and 30 to 50 parts by weight of the dipropylene glycol compound. Less than 10 parts by weight of the polyethylene glycol monoether compound fails to give sufficient volatilization suppressing properties to the oil based ink composition. More than 30 parts by weight unfavorably results in relative reduction of the contents of the diethylene glycol compound and the dipropylene glycol compound.

The oil based ink composition of the present invention can further contain other organic solvents in addition to the aforesaid diethylene glycol compound, dipropylene glycol compound, and polyethylene glycol monoether compound that is used if desired.

The other organic solvents preferably include polar organic solvents, such as alcohols (e.g., methyl alcohol, ethyl alcohol, propyl alcohol, butyl alcohol, and fluoroalcohols), ketones (e.g., acetone, methyl ethyl ketone, and cyclohexanone), carboxylic esters (e.g., methyl acetate, ethyl acetate, propyl acetate, butyl acetate, methyl propionate, and ethyl propionate), and ethers (e.g., diethyl ether, dipropyl ether, tetrahydrofuran, and dioxane).

Where the oil based ink composition of the invention contains the diethylene glycol compound and the dipropylene glycol compound and does not contain the polyethylene glycol monoether compound, it is desirable that the diethylene glycol compound/dipropylene glycol compound mixture form a proportion of 75% by weight or more of the total organic solvent.

Where the oil based ink composition of the invention contains not only the diethylene glycol compound and the dipropylene glycol compound but also the polyethylene glycol monoether compound, it is desirable that the diethylene glycol compound/dipropylene glycol compound/polyethylene glycol monoether compound mixture make up a proportion of 80% by weight or more of the total organic solvent.

The oil based ink composition of the invention can further comprise a nonionic polyoxyethylene derivative in addition to the above-mentioned colorant and organic solvent. The polyoxyethylene derivative is preferably a compound that is liquid at ordinary temperature under atmospheric pressure. The polyoxyethylene derivative is capable of imparting re-dissolving properties to the oil based ink composition of the invention.

The polyoxyethylene derivative includes polyoxyethylene alkyl ethers, such as polyoxyethylene cetyl ethers (e.g., Nissan Nonion P-208, from NOF Corp.), polyoxyethylene oleyl ethers (e.g., Nissan Nonion E-202S and E-205S, from NOF Corp.), and polyoxyethylene lauryl ethers (e.g., Emulgen 106 and 108, from Kao Corp.), polyoxyethylene alkylphenol ethers, such as polyoxyethylene octylphenol ethers (e.g., Nissan Nonion HS-204.5, HS-206, and HS-208, from NOF Corp.), sorbitan monoesters, such as sorbitan monocaprylate (e.g., Nissan Nonion CP-08R, from NOF Corp.) and sorbitan monolaurate (e.g., Nissan Nonion LP-20R, from NOF Corp.), polyoxyethylene sorbitan monoesters, such as polyoxyethylene sorbitan monostearate (e.g., Nissan Nonion OT-221, from NOF Corp.), polycarboxylic acid-based polymeric surfactants (e.g., Flowlen G-700, from Kyoei Chemical Co., Ltd.), polyoxyethylene higher alcohol ethers (e.g., Emulgen 707 and 709, from Kao Corp.), tetraglycerol oleate (e.g., Poem J-4581, from Riken Vitamin Co., Ltd.), nonylphenol ethoxylate (e.g., Adekatol NP-620, NP-650, NP-660, NP-675, NP-683, and NP-686, from Asahi Denka Co., Ltd.), aliphatic phosphoric esters (e.g., Adekacol CS-141E and TS-230E, from Asahi Denka Co., Ltd.), sorbitan sesquioleate (e.g., Sorgen 30, from Daiichi Kogyo Seiyaku Co., Ltd.), sorbitan mono-oleate (e.g., Sorgen 40, from Daiichi Kogyo Seiyaku Co., Ltd.), polyethylene glycol sorbitan monolaurate (e.g., Sorgen TW-20, from Daiichi Kogyo Seiyaku Co., Ltd.), and polyethylene glycol sorbitan mono-oleate (e.g., Sorgen TW-80, from Daiichi Kogyo Seiyaku Co., Ltd.). The polyoxyethylene derivative also includes acetylene glycol surface active agents. Preferred examples of the acetylene glycol surface active agents include compounds represented by general formula (IV):

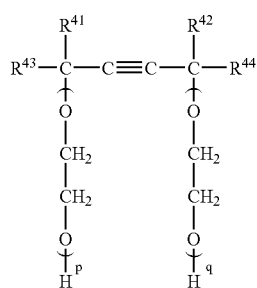

wherein $0 \leq p+q \leq 50$; $R^{41}$, $R^{42}$, and $R^{44}$ each independently represent an alkyl group, preferably an alkyl group having 1 to 6 carbon atoms.

Of the compounds represented by general formula (IV) particularly preferred are 2,4,7,9-tetramethyl-5decyne-4,7-diol, 3,6-dimethyl-4-octyne-3,6-diol, and 3,5-dimethyl-1-hexyn-3-ol. Commercially available acetylene glycol surface active agents represented by general formula (IV) can be made use of. Examples thereof are Surfynol 104, 82, 465, 485 and TG (all available from Air Products and Chemicals, Inc.) and Olfin STG and Olfin E1010 (both available from Nisshin Chemical Industry Co., Ltd.).

Other commercially available products can be made use of as the polyoxyethylene derivative. Examples thereof are Nissan Nonion A-10R and A-13R (from NOF Corp.), Flowlen TG-740W and D-90 (from Kyoei Chemical Co., Ltd.), Emulgen A-90 and A-60 (from Kao Corp.), and Noigen CX-100 (from Daiichi Kogyo Seiyaku Co., Ltd.).

The polyoxyethylene derivative content in the oil based ink composition of the invention is decided appropriately depending on the re-dissolving properties to be imparted and is preferably 5 to 200% by weight, still preferably 30 to 120% by weight, based on the colorant (particularly pigment) content of the ink composition.

The oil based ink composition of the invention can contain a dispersant. Dispersants used in general oil based ink compositions, particularly oil based ink compositions for ink jet recording, can be used arbitrarily. Those effectively acting on organic solvents having a solubility parameter of 8 to 11 are especially preferred. Commercially available products can be made use of as such a dispersant. Examples thereof are polyester compounds available under trade names: Hinoact KF1-M, T-6000, T-7000, T-8000, T-8350P, and T-8000, from Takefu Fine Chemical Co., Ltd.; Solsperse 20000, 24000, 32000, 32500, 33500, 34000, and 35200, from Avecia; Disperbyk-161, 162, 163, 164, 166, 180, 190, 191, and 192, from BYK-Chemie; Flowlen DOPA-17, 22, 33, and G-700, from Kyoei Chemical Co., Ltd.; Ajisper PB821 and PB711, from Ajinomoto Co., Inc.; LP4010, LP4050, LP4055, and POLYMER 400, 401, 402, 403, 450, 451, and 453, from Efka Chemicals.

The content of the dispersant in the oil based ink composition of the invention is selected appropriately according to the colorant to be dispersed. It preferably ranges from 5 to 200% by weight, particularly 30 to 120% by weight, based on the colorant (especially pigment) content of the ink composition.

The oil based ink composition of the invention can further comprise other additives used in general oil based ink compositions in addition to the colorant and organic solvent described supra. Such additives include stabilizers (e.g., antioxidants and ultraviolet absorbers), surface active agents, and binder resins. Useful antioxidants include BHA (2,3-butyl-4-hydroxyanisole) and BHT (2,6-di-t-butyl-p-cresol). Useful ultraviolet absorbers include benzophenone compounds and benzotriazole compounds. The surface active agent can be any of anionic, cationic, amphoteric, and nonionic types. The binder resin is useful for adjusting the viscosity of the oil based ink composition of the invention. The viscosity (at 20° C.) of the oil based ink composition of the invention is, for example, 10 mpa·s, preferably 5 mpa·s. Useful binder resins include acrylic resins, styrene acrylic resins, rosin-modified resins, phenolic resins, terpene resins, polyester resins, polyamide resins, epoxy resins, vinyl chloride-vinyl acetate copolymers, cellulosic resins (e.g., cellulose acetate butyrate), and vinyltoluene-α-methylstyrene copolymers. An appropriately selected binder resin content will improve fixability of the colorant on a recording medium.

The oil based ink composition of the present invention is prepared in known customary methods. In using a pigment as a colorant, for example, the pigment, a dispersant, and a portion of the diethylene glycol compound/dipropylene glycol compound mixture are mixed up and dispersed in a ball mill, a bead mill, an ultrasonic mill, a jet mill, etc. to prepare a pigment dispersion, which is adjusted to have desired ink characteristics. A binder resin, the rest of the diethylene glycol compound/dipropylene glycol compound mixture, and other additives (e.g., a dispersion aid and a viscosity modifier) are added to the pigment dispersion while stirring to obtain an oil based pigment ink composition. Alternatively, an oil based ink composition is obtained by using a combination of a pigment and a dye as a colorant in the same manner as for the oil based pigment ink composition.

While the physical properties of the oil based ink composition of the invention are not particularly limited, the oil based ink composition of the invention preferably has, for example, a surface tension of 20 to 50 mN/m. An ink composition having a surface tension less than 20 mN/m tends to wet and spread on the surface of an ink jet recording printer head or leak and be difficult to eject in droplets. An ink composition having a surface tension more than 50 mN/m does not wet nor spread on the surface of a recording medium, resulting in a failure of satisfactory printing.

The oil based ink composition of the invention is advantageous in that it is inert to the surface of an ejection nozzle having been subjected to an ink-repellent treatment. Accordingly, the oil based ink composition of the invention is used to advantage in an ink jet recording method in which an ink composition is ejected from a printer head having an ejection nozzle surface which has been subjected to an ink repellent treatment. The oil based ink composition of the invention is free from such drawbacks as observed with conventional oil based inks when used with an ink-repellent head, that is, the phenomenon of the ink's wetting and spreading on the ink-repellent head, the instable ejection phenomenon, and the phenomenon of the ink's corroding the head.

The ink composition of the invention is suitably used even with an ink jet recording head in which the surface of the nozzle plate has an ink repellent treatment. The combination of the ink composition according to the invention and an ink jet recording head having an ink repellent treatment minimizes deviation of the flight of ink droplets and achieves satisfactory image formation on recording paper. The ink composition of the invention keeps the surface of the nozzle plate having an ink repellent treatment in a good condition for a long time thereby to maintain ink ejection stability for a long time.

The material making the nozzle plate of the ink jet recording head, from which the ink composition of the invention is ejected, preferably includes, but is not limited to, metals, ceramics, silicones, glass, and plastics. The nozzle plate is still preferably made of single elements, such as titanium, chromium, iron, cobalt, nickel, copper, zinc, tin, and gold; alloys, such as nickel-phosphorus, tin-copper-phosphorus, copper-zinc, and stainless steel; polycarbonates, polysulfones, acrylonitrile-butadiene-styrene copolymers, polyethylene terephthalate, and polysulfones; and various photosensitive resins.

The ink repellent treatment for the nozzle plate is not particularly restricted but is preferably carried out by codeposition plating. Codeposition plating is performed by, for example, immersing a plate member in a bath containing an ionized metal and electrically dispersed ink-repellent polymer particles while stirring to form an ink-repellent layer on the plate surface. The ink-repellent polymer material includes polytetrafluoroethylene, polyperfluoroalkoxybutadienes, polyfluorovinylidene, polyfluorovinyl, polydiperfluoroalkyl fumarates, and mixtures thereof. The ionized metal includes nickel, copper, silver, tin, and zinc ions. It is preferable to use metallic materials which provide high surface hardness and excellent wearability, such as nickel, a nickel-cobalt alloy, and a nickel-boron alloy.

A preferred ink jet recording head capable of ejecting the ink composition of the invention has an ink-repellent fluoropolymer surface layer 15 electrolytically codeposited on the surface of a nozzle plate having an ink ejection orifice 14 as shown in the schematic cross-section of FIG. 1. The ink jet recording head shown in FIG. 1 comprises at least an ink channel-forming member 11 which forms an ink channel 12, a member 13 which forms a surface with an ink ejection orifice 14, an ink-repellent surface layer 15 which is formed on the surface of the member 13 and made of a codeposited fluoropolymer, a piezoelectric element 16, and a drive line 17 which drives the piezoelectric element. Stable ejection of the ink composition is secured by the surface layer 15.

The ink jet recording head capable of ejecting the ink composition of the invention preferably has the ink-repellent layer formed on the nozzle plate as in the heads disclosed in JP-A-5-116332, JP-A-6-246921 or JP-A-7-125220, the disclosures of which are incorporated herein by reference.

Figure 2:
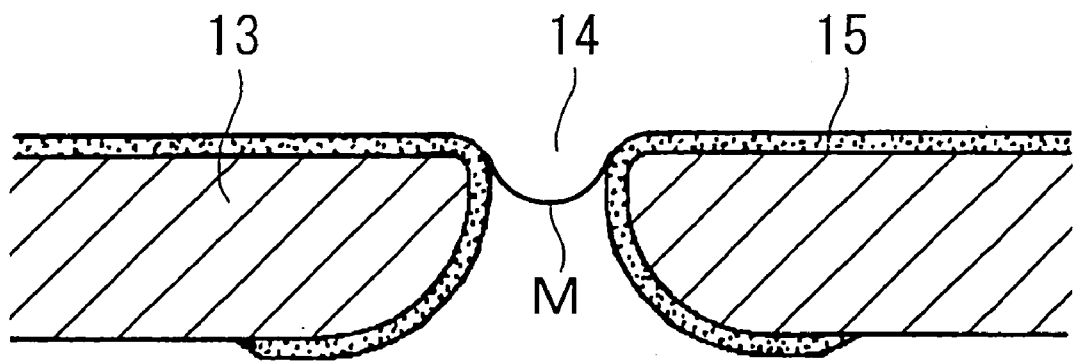
FIG. 2 is a schematic cross-section of an ink ejection orifice and its vicinity of a nozzle plate of another example of a printer head for ink jet recording, which can be used in the ink jet recording method of the present invention, having an ejection nozzle surface which has been subjected to an ink repellent treatment.

More concretely, as shown in the schematic cross-section of FIG. 2, the nozzle plate comprises a member 13 having an ink ejection orifice 14 that forms a meniscus M and an ink-repellent surface layer 15 which is formed on the surface of the member 13 and made of a codeposited fluoropolymer. The surface layer 15 extends to reach the reverse side of the nozzle plate. The nozzle plate shown in the schematic cross-section of FIG. 3 also has a member 13 having an ink ejection orifice 14 that forms a meniscus M and an ink-repellent surface layer 15 which is formed on the surface of the member 13 and made of a codeposited fluoropolymer. The surface layer 15 covers part of the inner wall of the nozzle orifice. The nozzle plate shown in the schematic cross-section of FIG. 4 also has a member 13 having an ink ejection orifice 14 that forms a meniscus M and an ink-repellent surface layer 15 which is formed on the surface of the member 13 and made of a codeposited fluoropolymer. The surface layer 15 covers the nozzle plate surface except the periphery of the nozzle orifice. The ink composition of the invention is satisfactorily ejected from any of these heads.

The ink repellent treated ejection nozzle can be produced by various known methods, which include depositing or coating with a fluoropolymer or a fluoro-oligomer, coating with a silicone varnish or a silicone oil, or coating with a silazane compound as taught in JP-A-55-148170. For example, part of or the whole of the nozzle surface is plated by codeposition of polytetrafluoroethylene (PTFE) (fluoropolymer particles) and nickel (Ni).

The oil based ink composition of the present invention is applicable to various ink jet recording systems, i.e., an electric field control system in which ink is ejected by using an electrostatic force, a drop-on-demand or pressure pulse system in which ink is ejected by using a driving pressure of a piezoelectric element, and a bubble jet or thermal jet system in which ink is ejected by using the pressure of an air bubble formed and expanded by high heat. The oil based ink composition of the invention is particularly suited for application to the drop-on-demand system in which ink is ejected by making use of the driving pressure of a piezoelectric element. This printing system assures excellent ejection stability to provide highly precise images free from color blur or color bleeding. Besides, the resulting images have excellent resistance against abrasion and water.

Further, when used in heavy-duty inkjet recording apparatus, the oil based ink composition of the present invention is capable of forming high-quality images on large size recording media, such as A0 size paper.

EXAMPLES

The present invention will now be illustrated in greater detail with reference to the following Examples, but it should be understood that the present invention is not construed as being limited thereto.

The particulars of the compounds and organic solvents used in the following ink compositions are as follows.

"Mixed organic solvent A" is a mixture consisting of 40 wt % diethylene glycol diethyl ether and 60 wt % dipropylene glycol monomethyl ether. "Mixed organic solvent B" is a mixture consisting of 40 wt % diethylene glycol diethyl ether, 40 wt % dipropylene glycol monomethyl ether, and 20 wt % triethylene glycol monomethyl ether.

"Acrylic acid copolymer" is a cationic acrylic oligomer having an acrylic skeleton with a tertiary ammonium salt added (Flowlen DOPA-33, available from Kyoei Chemical Co., Ltd.).

"Polyester compound" is Hinoact KF1-M, available from Takefu Fine Chemical Co., Ltd. "Polyoxyethylene derivative" is a nonionic surface active agent Nissan Nonion, available from NOF Corp.

Example 1

(1) Formulations of Ink Compositions

Four ink compositions consisting of the following components were prepared.

(a) Formulation of Yellow Ink Composition

| | |
|---|---|
| C.I. Pigment Yellow 150 | 4.0 wt % |
| Acrylic acid copolymer (dispersant) | 2.4 wt % |
| Mixed organic solvent A | 93.1 wt % |
| Vinyl chloride-vinyl acetate copolymer (binder resin) | 0.5 wt % |

(b) Formulation of Magenta Ink Composition

| | |
|---|---|
| C.I. Pigment Red 122 | 4.0 wt % |
| Acrylic acid copolymer (dispersant) | 2.0 wt % |
| Mixed organic solvent A | 93.5 wt % |
| Vinyl chloride-vinyl acetate copolymer (binder resin) | 0.5 wt % |

(c) Formulation of Cyan Ink Composition

| | |
|---|---|
| C.I. Pigment Blue 15:4 | 4.0 wt % |
| Acrylic acid copolymer (dispersant) | 1.8 wt % |
| Mixed organic solvent A | 93.7 wt % |
| Vinyl chloride-vinyl acetate copolymer (binder resin) | 0.5 wt % |

(d) Formulation of Black Ink Composition

| | |
|---|---|
| Carbon black | 4.0 wt % |
| Acrylic acid copolymer (dispersant) | 1.8 wt % |
| Mixed organic solvent A | 93.7 wt % |
| Vinyl chloride-vinyl acetate copolymer (binder resin) | 0.5 wt % |

(2) Preparation of Ink Compositions

The pigment, dispersant and part of mixed organic solvent A out of the above-described components were stirred in a dissolver at 3000 rpm for 1 hour and preliminarily dispersed in a bead mill containing zirconia beads (2 mm). The preliminarily dispersed pigment particles were found to have an average particle size of 5 µm or smaller. The preliminary dispersion was then dispersed in a nanomill containing zirconia beads (0.3 mm) to obtain a pigment dispersion. While varying with the kind of the pigment, the average particle size of the resulting pigment particles was from 50 nm to 200 nm.

The binder resin and the rest of the mixed organic solvent A were mixed into the pigment dispersion while stirring at 4000 rpm, and the pigment content was adjusted to 4 wt % to prepare a set of four pigment ink compositions according to the present invention.

Example 2

(1) Formulations of Ink Compositions

Four ink compositions comprising the following components were prepared.

(a) Formulation of Yellow Ink Composition

| | |
|---|---|
| C.I. Pigment Yellow 150 | 4.0 wt % |
| Polyester compound (dispersant) | 2.4 wt % |
| Polyoxyethylene derivative | 0.5 wt % |
| Mixed organic solvent A | 93.1 wt % |

(b) Formulation of Magenta Ink Composition

| | |
|---|---|
| C.I. Pigment Red 122 | 4.0 wt % |
| Polyester compound (dispersant) | 2.0 wt % |
| Polyoxyethylene derivative | 0.5 wt % |
| Mixed organic solvent A | 93.5 wt % |

(c) Formulation of Cyan Ink Composition

| | |
|---|---|
| C.I. Pigment Blue 15:4 | 4.0 wt % |
| Polyester compound (dispersant) | 1.8 wt % |
| Polyoxyethylene derivative | 0.5 wt % |
| Mixed organic solvent A | 93.7 wt % |

(d) Formulation of Black Ink Composition

| | |
|---|---|
| Carbon black | 4.0 wt % |
| Polyester compound (dispersant) | 1.8 wt % |
| polyoxyethylene derivative | 0.5 wt % |
| Mixed organic solvent A | 93.7 wt % |

(2) Preparation of Ink Compositions

The pigment, dispersant and part of mixed organic solvent A out of the above-described components were stirred in a dissolver at 3000 rpm for 1 hour and preliminarily dispersed in a bead mill containing zirconia beads (2 mm). The preliminarily dispersed pigment particles were found to have an average particle size of 5 µm or smaller. The preliminary dispersion was then dispersed in a nanomill containing zirconia beads (0.3 mm) to obtain a pigment dispersion. While varying with the kind of the pigment, the average particle size of the resulting pigment particles was from 50 nm to 200 nm.

Customary additives, the polyoxyethylene derivative, and the rest of the mixed organic solvent A were mixed into the pigment dispersion while stirring at 4000 rpm, and the pigment content was adjusted to 4 wt % to prepare a set of four pigment ink compositions according to the present invention.

Example 3

(1) Formulations of Ink Compositions

Six ink compositions comprising the following components were prepared.

(a) Formulation of Yellow Ink Composition

| | |
|---|---|
| C.I. Pigment Yellow 150 | 4.0 wt % |
| Polyester compound (dispersant) | 2.5 wt % |
| Polyoxyethylene derivative | 2.0 wt % |
| Cellulose acetate butyrate (binder resin) | 0.2 wt % |
| Mixed organic solvent B | 91.3 wt % |

(b) Formulation of Magenta Ink Composition

| | |
|---|---|
| C.I. Pigment Red 122 | 4.0 wt % |
| Polyester compound (dispersant) | 2.0 wt % |
| Polyoxyethylene derivative | 2.0 wt % |
| Cellulose acetate butyrate (binder resin) | 0.2 wt % |
| Mixed organic solvent B | 91.8 wt % |

(c) Formulation of Light Magenta Ink Composition

| | |
|---|---|
| C.I. Pigment Red 122 | 1.0 wt % |
| Polyester compound (dispersant) | 0.5 wt % |
| Polyoxyethylene derivative | 0.5 wt % |
| Cellulose acetate butyrate (binder resin) | 0.8 wt % |
| Mixed organic solvent B | 97.2 wt % |

(d) Formulation of Black Ink Composition

| | |
|---|---|
| Carbon black | 4.0 wt % |
| Polyester compound (dispersant) | 2.0 wt % |
| Polyoxyethylene derivative | 2.0 wt % |
| Cellulose acetate butyrate (binder resin) | 0.2 wt % |
| Mixed organic solvent B | 91.8 wt % |

(e) Formulation of Cyan Ink Composition

| | |
|---|---|
| C.I. Pigment Blue 15:4 | 3.0 wt % |
| Polyester compound (dispersant) | 2.0 wt % |
| Polyoxyethylene derivative | 2.0 wt % |
| Cellulose acetate butyrate (binder resin) | 0.2 wt % |
| Mixed organic solvent B | 92.8 wt % |

(f) Formulation of Light Cyan Ink Composition

| | |
|---|---|
| C.I. Pigment Blue 15:4 | 0.8 wt % |
| Polyester compound (dispersant) | 0.5 wt % |
| Polyoxyethylene derivative | 0.4 wt % |
| Cellulose acetate butyrate (binder resin) | 0.8 wt % |
| Mixed organic solvent B | 97.5 wt % |

(2) Preparation of Ink Compositions

The pigment, dispersant and part of mixed organic solvent B out of the above-described components were stirred in a dissolver at 3000 rpm for 1 hour and preliminarily dispersed in a bead mill containing zirconia beads (2 mm). The preliminarily dispersed pigment particles were found to have an average particle size of 5 μm or smaller. The preliminary dispersion was then dispersed in a nanomill containing zirconia beads (0.3 mm) to obtain a pigment dispersion. While varying with the kind of the pigment, the average particle size of the resulting pigment particles was from 50 nm to 200 nm.

The binder resin, customary additives, the polyoxyethylene derivative, and the rest of the mixed organic solvent B were mixed into the pigment dispersion while stirring at 4000 rpm, and the pigment content was adjusted to the weight percentage shown in the formulations described supra to prepare a set of six pigment ink compositions according to the present invention.

Example 4

(1) Formulations of Ink Compositions

Six ink compositions comprising the following components were prepared.

(a) Formulation of Yellow Ink Composition

| | |
|---|---|
| C.I. Pigment Yellow 150 | 4.0 wt % |
| Acrylic acid copolymer (dispersant) | 8.0 wt % |
| Polyoxyethylene derivative | 2.0 wt % |
| Cellulose acetate butyrate (binder resin) | 0.2 wt % |
| Mixed organic solvent B | 85.3 wt % |

(b) Formulation of Magenta Ink Composition

| | |
|---|---|
| C.I. Pigment Red 122 | 4.0 wt % |
| Acrylic acid copolymer (dispersant) | 6.5 wt % |
| Polyoxyethylene derivative | 2.0 wt % |
| Cellulose acetate butyrate (binder resin) | 0.2 wt % |
| Mixed organic solvent B | 87.3 wt % |

(c) Formulation of Light Magenta Ink Composition

| | |
|---|---|
| C.I. Pigment Red 122 | 1.0 wt % |
| Acrylic acid copolymer (dispersant) | 1.5 wt % |
| Polyoxyethylene derivative | 0.5 wt % |
| Cellulose acetate butyrate (binder resin) | 0.8 wt % |
| Mixed organic solvent B | 96.2 wt % |

(d) Formulation of Black Ink Composition

| | |
|---|---|
| Carbon black | 4.0 wt % |
| Acrylic acid copolymer (dispersant) | 6.5 wt % |
| Polyoxyethylene derivative | 2.0 wt % |
| Cellulose acetate butyrate (binder resin) | 0.2 wt % |
| Mixed organic solvent B | 87.3 wt % |

(e) Formulation of Cyan Ink Composition

| | |
|---|---|
| C.I. Pigment Blue 15:4 | 3.0 wt % |
| Acrylic acid copolymer (dispersant) | 6.5 wt % |

-continued

| | |
|---|---|
| Polyoxyethylene derivative | 2.0 wt % |
| Cellulose acetate butyrate (binder resin) | 0.2 wt % |
| Mixed organic solvent B | 88.3 wt % |

(f) Formulation of Light Cyan Ink Composition

| | |
|---|---|
| C.I. Pigment Blue 15:4 | 0.8 wt % |
| Acrylic acid copolymer (dispersant) | 1.5 wt % |
| Polyoxyethylene derivative | 0.4 wt % |
| Cellulose acetate butyrate (binder resin) | 0.8 wt % |
| Mixed organic solvent B | 96.5 wt % |

(2) Preparation of Ink Compositions

The pigment, dispersant and part of mixed organic solvent B out of the above-described components were stirred in a dissolver at 3000 rpm for 1 hour and preliminarily dispersed in a bead mill containing zirconia beads (2 mm). The preliminarily dispersed pigment particles were found to have an average particle size of 5 μm or smaller. The preliminary dispersion was then dispersed in a nanomill containing zirconia beads (0.3 mm) to obtain a pigment dispersion. While varying with the kind of the pigment, the average particle size of the resulting pigment particles was from 50 nm to 200 nm.

The binder resin, customary additives, the polyoxyethylene derivative, and the rest of the mixed organic solvent B were mixed into the pigment dispersion while stirring at 4000 rpm, and the pigment content was adjusted to the weight percentage shown in the formulations described supra to prepare a set of six pigment ink compositions according to the present invention.

Comparative Example 1

A set of ink compositions of Comparative Example 1 were prepared in the same manner as in Example 1 using the same formulations (a) to (d), except for replacing mixed organic solvent A with diethylene glycol diethyl ether in each of the formulations.

Comparative Example 2

A set of ink compositions of Comparative Example 2 were prepared in the same manner as in Example 1 using the same formulations (a) to (d), except for replacing mixed organic solvent A with diethylene glycol monoethyl ether.

Comparative Example 3

A set of ink compositions of Comparative Example 3 were prepared in the same manner as in Example 1 using the same formulations (a) to (d), except for replacing mixed organic solvent A with dipropylene glycol monomethyl ether.

Comparative Example 4

A set of ink compositions of Comparative Example 4 were prepared in the same manner as in Example 1 using the same formulations (a) to (d), except for replacing mixed organic solvent A with tripropylene glycol monomethyl ether.

Printing Tests for Evaluation (1) Printing Procedure

An ink jet recording medium (vinyl chloride film surface-treated with a cellulosic resin, produced by Eastman Chemical Company) was printed with each of the ink compositions prepared in Examples 1 to 4 and Comparative Examples 1 to 4 on an inkjet printer MJ-8000C, supplied by Seiko Epson Corp.

(2) Evaluation-1: Printing Stability

The printer was loaded with each of the ink compositions, and printing was carried out continuously on the recording medium for a long time at ordinary temperature. Occurrence of dot missing, flight deviation, and ink splash was observed (the number of occurrences was counted). The counts were rated A to C according to the following standard. The results obtained are shown in Table 1 (Evaluation 1).

| | |
|---|---|
| A: | The number of occurrences of dot missing, flight deviation and ink splash in consecutive 48 hour printing was less than 10. |
| B: | The number of occurrences of dot missing, flight deviation and ink splash in consecutive 48 hour printing was 10 or more. |
| C: | The number of occurrences of dot missing, flight deviation and ink splash in consecutive 24 hour printing was 10 or more. |

(3) Evaluation-2: Non-clogging Properties

The printer was loaded with the ink composition, and alphabets and figures were continuously printed for 10 minutes. The printer was switched off and left to stand with no cap on for two weeks in an environment of 40 C and 25% relative humidity (RH). After the 2-week suspension, printing alphabets and figures was resumed. The number of cleaning operations required to obtain print quality equal to that before the standing was recorded. The counts were rated A to C according to the following standard. The results obtained are shown in Table 1 (Evaluation 2).

| | |
|---|---|
| A: | Print quality equal to the initial one (before the standing) was restored after zero to two cleaning operations. |
| B: | Print quality equal to the initial one was restored after three to five cleaning operations. |
| C: | Print quality equal to the initial one was restored after six or more cleaning operations. |

(4) Evaluation-3: Ink Fixation

The printing medium was printed solid and with character letters. Immediately after the printing, the printed area was rubbed strongly with a finger at 25° C. and 50% RH. The results were rated A to C according to the following standard. The rating results are shown in Table 1 (Evaluation-3).

| | |
|---|---|
| A: | Neither smearing nor ink separation occurred. |
| B: | Smearing and ink separation slightly occurred, but the letters were readable with no problem. |
| C: | Smearing and ink separation both occurred. |

(5) Evaluation-4: Ink Storage Stability

Fifty grams of the ink composition was weighed into a bottle of polytetrafluoroethylene (Teflon, a registered trade name) and allowed to stand as sealed at 60° C. for one week. After the standing, the viscosity and the particle size distribution of the ink composition were measured. The storage stability of the ink composition was rated A to D according to the following standard. The results obtained are shown in Table 1 (Evaluation-4).

| | |
|---|---|
| A: | The differences in viscosity and particle size distribution between before and after the standing were smaller than 3%. |
| B: | The differences in viscosity and particle size distribution between before and after the standing were smaller than 5%. |
| C: | The differences in viscosity and particle size distribution between before and after the standing were smaller than 10%. |
| D: | The differences in viscosity and particle size distribution between before and after the standing were 10% or greater. |

(6) Evaluation-5: Attack to Nozzle Plate Having Ink-repellent Treatment

The nozzle plate used in the ink jet printer MJ-8000 (Seiko Epson Corp.) has an ink-repellent treatment. That is, the stainless steel plate having a nozzle opening is plated by codeposition of nickel and polytetrafluoroethylene (Teflon, a registered trade name). The ink-repellent treated nozzle plate was soaked in each ink composition and allowed to stand at 40° C. for one week. Thereafter, the contact angle between the thus treated nozzle plate and the ink composition was measured. The results obtained are shown in Table 1 (Evaluation-5).

| | |
|---|---|
| A: | The contact angle was 30° or greater. |
| B: | The contact angle was greater than 10° and smaller than 30°. |
| C: | The contact angle was 10° or smaller. |

(7) Test Results

TABLE 1

| | | Evaluation of Ink Composition | | | | |
|---|---|---|---|---|---|---|
| | | 1 | 2 | 3 | 4 | 5 |
| Example 1 | a | A | A | A | A | A |
| | b | A | A | A | A | A |
| | c | A | A | A | A | A |
| | d | A | A | A | A | A |

TABLE 1-continued

| | | Evaluation of Ink Composition | | | | |
|---|---|---|---|---|---|---|
| | | 1 | 2 | 3 | 4 | 5 |
| Example 2 | a | A | A | A | A | A |
| | b | A | A | A | A | A |
| | c | A | A | A | A | A |
| | d | A | A | A | A | A |
| Example 3 | a | A | A | A | A | A |
| | b | A | A | A | A | A |
| | c | A | A | A | A | A |
| | d | A | A | A | A | A |
| | e | A | A | A | A | A |
| | f | A | A | A | A | A |
| Example 4 | a | A | A | A | A | A |
| | b | A | A | A | A | A |
| | c | A | A | A | A | A |
| | d | A | A | A | A | A |
| | e | A | A | A | A | A |
| | f | A | A | A | A | A |
| Comparative Example 1 | a | C | C | B | C | A |
| | b | C | C | B | C | A |
| | c | C | C | B | C | A |
| | d | C | C | B | C | A |
| Comparative Example 2 | a | A | A | C | B | A |
| | b | A | A | C | B | A |
| | c | A | A | C | B | A |
| | d | A | A | C | B | A |
| Comparative Example 3 | a | A | A | B | C | A |
| | b | A | A | B | C | A |
| | c | A | A | B | C | A |
| | d | A | A | B | C | A |
| Comparative Example 4 | a | C | C | C | B | C |
| | b | C | C | C | B | C |
| | c | C | C | C | B | C |
| | d | C | C | C | B | C |

INDUSTRIAL APPLICABILITY

The oil based ink composition according to the present invention assures excellent ejection stability particularly when applied to a drop-on-demand system and provides highly precise images excellent in abrasion resistance and water resistance and free from color blur or color bleeding.

While the invention has been described with reference to the specific embodiments thereof, it should be understood that various changes and modifications can be made therein without departing from the spirit and the scope thereof.

The invention claimed is:

1. An oil based ink composition for ink jet recording containing, as an organic solvent, a mixture of a diethylene glycol compound that is liquid at ordinary temperature under atmospheric pressure and a dipropylene glycol compound that is liquid at ordinary temperature under atmospheric pressure at a diethylene glycol compound to dipropylene glycol compound weight ratio of 20:80 to 80:20.

2. The oil based ink composition according to claim 1, wherein said diethylene glycol compound is represented by general formula (I):

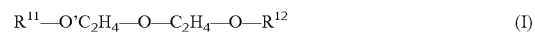

$$R^{11}\text{—O'}C_2H_4\text{—O—}C_2H_4\text{—O—}R^{12} \quad (I)$$

wherein $R^{11}$ and $R^{12}$ each independently represent a hydrogen atom, an alkyl group having 1 to 4 carbon atoms or a group $R_{13}CO$: and $R_{13}$ represents an alkyl group having 1 to 4 carbon atoms.

3. The oil based ink composition according to claim 2, wherein said diethylene glycol compound is diethylene glycol diethyl ether.

4. The oil based ink composition according to claim 1, wherein said dipropylene glycol compound is represented by general formula (II):

$$R^{21}-O-C_3H_6-O-C_3H_6-O-R^{22} \quad (II)$$

wherein $R^{21}$ and $R^{22}$ each independently represent a hydrogen atom, an alkyl group having 1 to 4 carbon atoms or a group $R^{23}CO$; and $R^{23}$ represents an alkyl group having 1 to 4 carbon atoms.

5. The oil based ink composition according to claim 4, wherein said dipropylene glycol compound is dipropylene glycol monomethyl ether.

6. The oil based ink composition for ink jet recording according to claim 1, which further comprises a polyethylene glycol monoether compound that is liquid at ordinary temperature under atmospheric pressure and is represented by general formula (III):

$$R^{31}-O-(C_2H_4-O)_N-H \quad (III)$$

wherein $R^{31}$ represents an alkyl group having 1 to 6 carbon atoms; and n represents an integer of 3 to 6.

7. The oil based ink composition according to claim 6, wherein said polyethylene glycol monoether compound is a triethylene glycol monoether compound.

8. The oil based ink composition according to claim 6, wherein said polyethylene glycol monoether compound is a mixture of polyethylene glycol monoether compounds represented by general formula (III) in which n is 4 to 6.

9. The oil based ink composition according to claim 6, which comprises said diethylene glycol compound, said dipropylene glycol compound and said polyethylene glycol monoether compound in amounts of 30 to 50 parts by weight, 30 to 50 parts by weight and 10 to 30 parts by weight, respectively.

10. The oil based ink composition according to claim 1, which as a colorant content of 0.5 to 25% by weight based on the total weight of the ink composition.

11. The oil based ink composition according to claim 1, which contains a pigment as a colorant.

12. An ink jet recording method comprising ejecting an oil based ink composition according to claim 1 from an ink jet recording printer head having an ejection nozzle surface which has been subjected to an ink repellent treatment.

13. In an oil based ink composition for ink jet recording comprising a colorant and an organic solvent, the improvement wherein the organic solvent comprises a liquid mixture of a diethylene glycol compound and a dipropylene glycol compound that improves a printing stability or ink fixation characteristic of the ink composition in the ink jet recording as compared with the ink composition with an organic solvent wherein the diethylene glycol compound or dipropylene glycol compound is present singly, the diethylene glycol compound and dipropylene glycol compound being present in a ratio of between 20:80 and 80:20.

14. The oil based ink composition according to claim 13, wherein the colorant comprises a pigment and is present in the ink composition in an amount of 0.5 to 25% by weight.

15. The oil based ink composition according to claim 14, wherein the mixture comprises diethylene glycol diethyl ether and dipropylene glycol monomethyl ether.

16. The oil based ink composition according to claim 14, wherein the mixture comprises diethylene glycol diethyl ether, dipropylene glycol monomethyl ether and triethylene glycol monomethyl ether.

17. The oil based ink composition according to claim 13, wherein said diethylene glycol compound is represented by general formula (I):

$$R^{11}-O-C_2H_4-O-C_2H_4-O-R^{12} \quad (I)$$

wherein $R^{11}$ and $R^{12}$ each independently represent a hydrogen atom, an alkyl group having 1 to 4 carbon atoms or a group $R^{13}CO$; and $R^{13}$ represents an alkyl group having 1 to 4 carbon atoms.

18. The oil based ink composition according to claim 13, wherein said dipropylene glycol compound is represented by general formula (II):

$$R^{21}-O-C_3H_6-O-C_3H_6-O-R^{22} \quad (II)$$

wherein $R^{21}$ and $R^{22}$ each independently represent a hydrogen atom, an alkyl group having 1 to 4 carbon atoms or a group $R^{23}CO$; and $R^{23}$ represents an alkyl group having 1 to 4 carbon atoms.

19. The oil based ink composition for ink jet recording according to claim 13, which further comprises a polyethylene glycol monoether compound that is liquid at ordinary temperature under atmospheric pressure and is represented by general formula (III):

$$R^{31}-O-(C_2H_4-O)_N-H \quad (III)$$

wherein $R^{31}$ represents an alkyl group having 1 to 6 carbon atoms; and n represents an integer of 3 to 6.

* * * * *